United States Patent

Hoffmann et al.

[15] 3,658,510

[45] Apr. 25, 1972

[54] RECOVERY OF SILVER FROM ELECTROLYTIC COPPER REFINERY SLIMES

[72] Inventors: James E. Hoffmann, Plainfield; Runyon G. Ernst, Woodbridge, both of N.J.

[73] Assignee: American Metal Climax, Inc., New York, N.Y.

[22] Filed: Apr. 14, 1970

[21] Appl. No.: 28,370

[52] U.S. Cl. ..........................75/99, 75/101 R, 75/120, 75/114, 75/117, 75/118, 75/119, 75/121
[51] Int. Cl. ..........................................C22b 15/08
[58] Field of Search..............75/99, 118, 100, 112, 114, 75/120, 101 R; 23/98, 87

[56] References Cited

UNITED STATES PATENTS

| 467,171 | 1/1892 | Hoyt | 75/114 |
| 712,640 | 11/1902 | Betts | 75/99 |
| 2,150,366 | 3/1939 | Ehrhart | 75/112 X |
| 2,060,539 | 11/1936 | Spies | 75/118 X |
| 1,448,475 | 3/1923 | Weisberg | 75/118 |
| 1,315,660 | 9/1919 | Ferguson | 75/99 |

*Primary Examiner*—L. Dewayne Rutledge
*Assistant Examiner*—G. T. Ozaki
*Attorney*—Kasper T. Serijan and Eugene J. Kalil

[57] ABSTRACT

Silver is recovered from electrolytic copper refinery slimes containing, in addition to silver, one or more of the elements Se, Te, Pb, Sb, Sn, As, Bi, Zn, Cu, Au, Ni. Fe, among others. A slurry is formed of the slimes in a hydrochloric acid solution which is agitated, during which excess chlorine gas is added to solubilize substantially all of the elements present, the silver being substantially quantitatively converted to silver chloride to form a silver-enriched residue. The residue is thereafter separated from the solution and the silver then recovered from the residue.

9 Claims, 2 Drawing Figures

Figure 1:
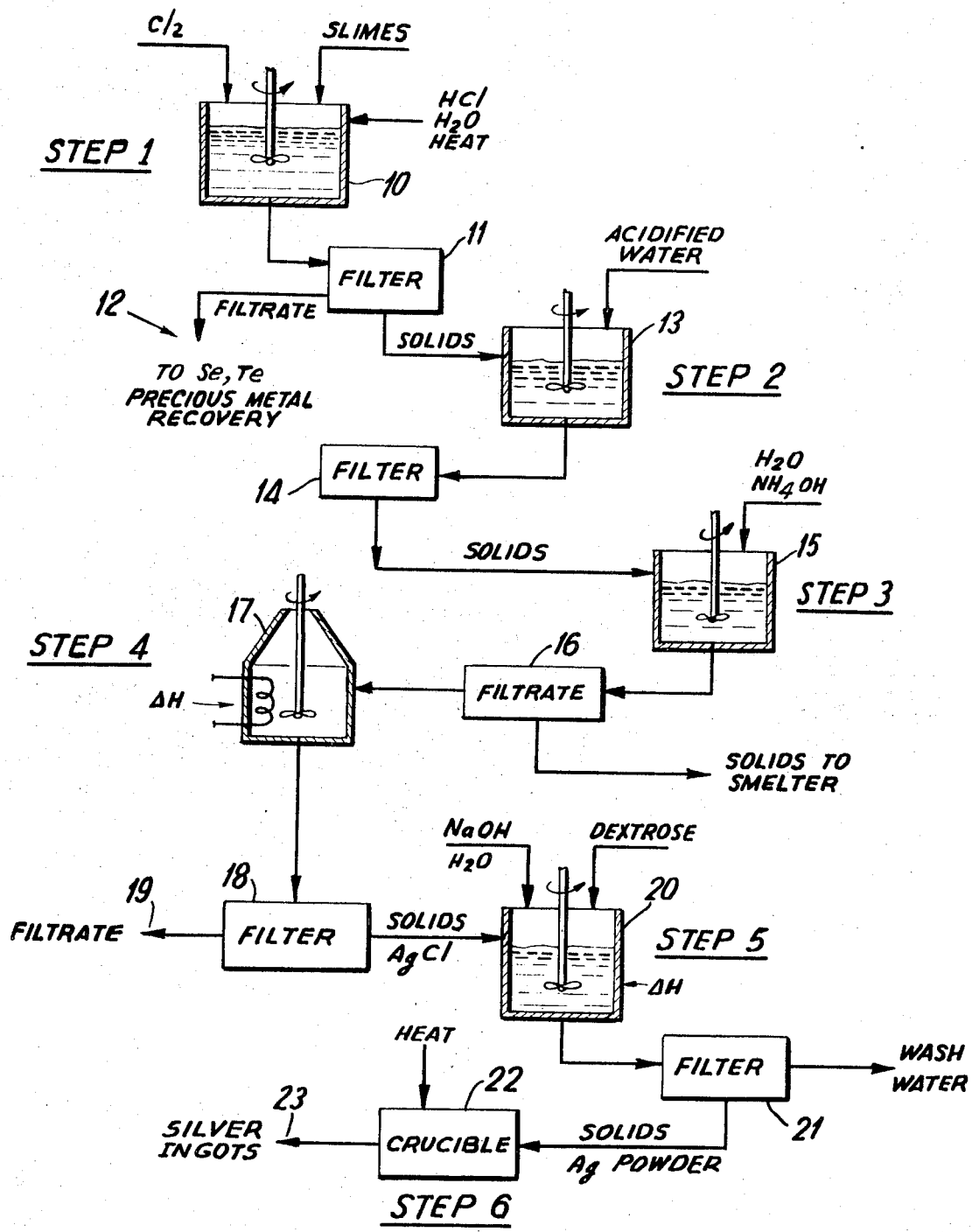
Figure 2:
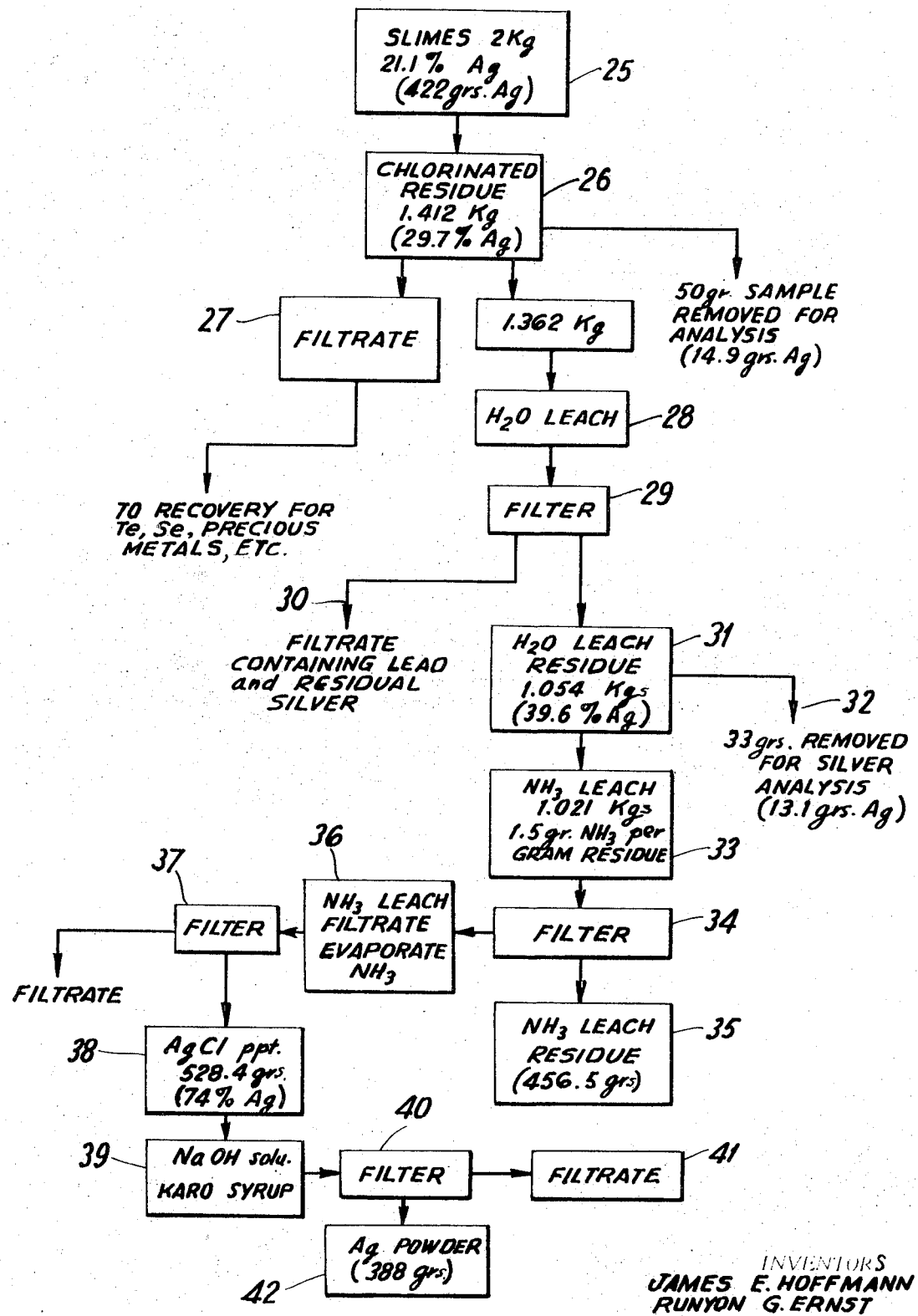

{'text': '# RECOVERY OF SILVER FROM ELECTROLYTIC COPPER REFINERY SLIMES\n\nThis invention relates to the recovery of silver from electrolytic copper refinery slimes containing selenium and/or tellurium, in addition to other elements, depending upon the source of the copper from which the electrolytic slimes are derived.\n\nMost electrolytic copper refinery slimes contain precious metals in which silver generally predominates. In recovering the precious metals and, in particular, silver, selenium and/or tellurium are usually obtained as a byproduct. Electrolytic copper refinery slimes are often called anode muds, electrolytic residues, sludges, and the like, which are all meant to be included in the term "slimes" as used herein. It is not uncommon for such slimes to contain Se, Te, Pb, Sb, Sn, As, Bi, Zn, Cu, Ag, Au, Pt, Pd and Fe, among other elements.\n\n## BACKGROUND OF THE INVENTION AND THE PRIOR ART\n\nOne prior art method of slimes treatment with the objective of recovering silver as one of the major byproducts has been to first screen out large particles of metallic copper and then decopperize the slimes of the bulk of the remaining copper by subjecting the slimes to an acid leach, e.g. sulfuric acid leach, preliminary to further treatment. The slimes thus treated are then smelted in a Doré furnace, during which some of the contained selenium is volatilized and partially recovered via scrubbers as a solution. During the smelting operation, the molten bath is subjected to three slagging steps comprising a first slagging with silica to take up mold wash, siliceous gangue, $Al_2O_3$, etc. The silica slag is then replaced with a soda ash slag (e.g. $Na_2CO_3$) which oxidizes any selenides present to $SeO_2$ gas for flue recovery, although some of the selenium may form selenates which enter the soda ash slag together with tellurites. This slag is skimmed off and replaced by a niter slag ($NaNo_3$) which oxidizes out other elements, such as Sb, Pb, Cu, small amounts of Se and/or Te, etc., which enter the slag. The molten metal remaining in the Doré furnace is rich in silver. A typical analysis of the Doré metal may comprise at least about 95% of Ag, up to about 4% of Au, Pt and Pd and residual copper in amounts less than 1%, e.g. ranging desirably from about 0.1 to 0.5% by weight. The metal is cast into a plate which is then transferred to an electrolytic parting plant where the silver is electrolytically dissolved out of the Doré plate employed as an anode in an electrolytic cell to produce high purity dendritic silver (99.99%) at a graphite cathode at the bottom of the cell, a sludge being formed as a by-product containing substantially all of the precious metals Au, Pt and Pd which sludge is subjected to further recovery treatments. An important problem characteristic of Doré furnacing is the fact that a substantial amount of silver enters the slag and must be recycled, thereby increasing "run-around" time.\n\nThe foregoing method is somewhat expensive in view of the necessity of pretreating the slimes using pyrometallurgical techniques. Moreover, the method is not wholly efficient. Since silver is the major metal being recovered, it would be desirable to provide a method in which substantially all of the silver can be easily and quickly separated from substantially all of the remaining elements without requiring an elaborate pretreatment of the slimes and without the necessity of using rather involved pyrometallurgical techniques which are known to be expensive and not always efficient.\n\n## OBJECTS OF THE INVENTION\n\nIt is thus the object of the invention to provide a hydrometallurgical method of directly separating silver from electrolytic copper refinery slimes.\n\nAnother object is to provide a hydrometallurgical method of separating silver from copper refinery slimes in which a silver-rich residue is produced in a first step having the silver quantitatively retained therein and from which the silver is subsequently quantitatively recovered, the filtrate remaining from the separated residue containing most of the other elements which are accessible to recovery without using pyrometallurgical techniques.\n\nA still further object is to provide a method for recovering high purity silver at high yield levels from electrolytic copper refinery slimes, the silver being hydrometallurgically recovered in the form of high purity silver powder.\n\nAnother object of this invention is to eliminate the necessity of using the Doré furnace cycle with its attendant energy and reagent requirements, along with long processing times, thus freeing the furnace for other service.\n\nThese and other objects will more clearly appear from the following disclosure and the appended drawing, wherein:\n\nFIG. 1 is a flow sheet showing the steps employed in recovering silver as high purity silver powder from electrolytic copper refinery slimes; and\n\nFIG. 2 illustrates the quantitative breakdown of the recovery starting with 2 kilograms of slimes having an analysis of 21.5% by weight of silver.\n\n## SUMMARY OF THE INVENTION\n\nStating it broadly, a hydrometallurgical method is provided for recovering silver from electrolytic copper refinery slimes which contain, in addition to silver, one or more of the elements Se, Te, Pb, Sb, Sn, As, Bi, Zn, Cu, Ni, Fe, Au, and the platinum group metals, such as Pt and Pd, among other elements. The method comprises forming a slurry of the slimes in a hydrochloric acid solution which is agitated while being simultaneously chlorinated with chlorine gas. During the chlorination step, substantially all of the elements are solubilized with the exception of silver and one or more of the lead, antimony, tin or silica that might be present, whereby a silver-rich residue is obtained containing silver chloride, with or without the aforementioned contaminants. The silver-rich residue is separated from the solution, which solution may be subsequently treated for the recovery of the remaining precious metals, Se, Te, etc. The silver-rich residue is subjected to hot water leaching (e.g. acidified water) to remove the bulk of the lead chloride present, thereby decreasing subsequent ammonia requirements and enhancing the leaching of the silver. The leached residue is further leached with ammonium hydroxide to solubilize the silver chloride. The hot water leaching enhances the leachability of the silver in ammonium hydroxide and aids in reducing the ammonia requirements.\n\nThe solution with the dissolved silver is separated from the residue and the residue washed, the wash water being collected with the solution, which is thereafter heated to evaporate the ammonia and produce a very pure silver chloride precipitate. The precipitate is then reduced to silver powder in an alkaline solution using any of a variety of organic materials suitable as reducing agents therefor, which include but are not limited to molasses, formaldehyde, acetaldehyde, sucrose, dextrose, among other sugars, especially the reducing sugars, and the like.\n\n## DETAIL ASPECTS OF THE INVENTION\n\nThe invention will now be described in detail with respect to FIGS. 1 and 2 as follows:\n\nWith regard to FIG. 1, reference is made to Step 1 in which copper refinery slimes containing about 21.5% silver are suspended in a solution of hydrochloric acid in reactor 10, the strength of the acid being dependent upon the subsequent treatments to be employed. An advantageous feature of the invention is that a relatively high solids loading can be employed in producing the slurried suspension, for example, a solids loading of 1 kg per liter of solution. The suspension is vigorously agitated as indicated in Step 1 and the solution chlorinated with gaseous chlorine at the maximum rate for rapid conversion without significant chlorine gas breakthrough. A plurality of reactors may be used in series in which the excess exhaust chlorine gas from one reactor can be introduced into the next one, thereby assuring 100% chlorine consumption efficiency.'}

The reaction is sufficiently exothermic so that the heat liberated raises the mixture to the boiling point (e.g. 100° to 112° C) and, if necessary, the mixture is maintained at the boiling point by the addition of heat. Preferably, Step 1 is carried out under reflux to maintain as high an acidity as possible in the solution. Hydrochloric acid is generated in the chlorination step; however, if the system is run without reflux, it tends towards an azeotropic composition at ≈6 normal concentration. A cold reflux condenser at about 0° to 10° C enables the reaction to be completed at a higher acid concentration, for example, at an acid concentration of about 8 to 9 normal or higher, e.g. 12$N$.

The final acid concentration in the subsequent treatment steps will depend upon the initial acidity and the quantity of chloride formers present which vary greatly with the slime. Normalities as high as about 15 have been obtained on occasion with the reflux temperature.

Upon completion of the chlorination treatment, the residue which is now enriched in silver as silver chloride and, possibly containing some lead chloride, is filtered at 11 to form a filtrate 12 containing Se, Te, precious metals other than silver, among other elements, which filtrate is then set aside, and the chlorination residue then washed, the wash water being thereafter combined with filtrate 12. The washed chlorinated residue is then leached in Step 2 with acidified boiling water (e.g. pH of about 3) by agitation in vessel 13 at a solids-liquid ratio of about 10:1 based on dry solids weight to remove the bulk of the lead chloride present. Generally speaking, the pH of the acid leach may range from about 0.5 to 5, it being understood that the pH need not necessarily be limited to this range. Leaching is carried out hot under agitation for about 1 hour, such as at the boiling point. The leached slurry is settled using a flocculant, the leach liquor being then decanted or filtered and the solids thereafter filtered at 14 and washed with hot or boiling water.

As stated above, the function of the hot acid leach and the hot water wash is to remove the bulk of the lead chloride present in the chlorination residue. The removal of lead chloride serves to reduce the amount of ammonia consumption during the subsequent ammoniacal leach. It also serves to increase the % extraction of AgCl from the chlorination residue during the ammonia leach. The lead value in the leach liquor can be recovered easily by neutralization of the liquor with soda ash ($Na_2CO_3$). No significant amount of silver dissolves in the lead chloride leaching step.

The water leach chlorination residue is then subjected to Step 3 by preferably forming a slurry of the residue in water in vessel 15 and adding concentrated ammonia to it. Generally speaking, the concentration of ammonia is rather flexible and may range from about 2$N$ to 15$N$. The ammonium requirements are calculated on the basis of 1 to 1.5 grams of ammonia per gram of residue taken on the dry basis. The ammonia leaching is carried out for about 1 hour cold, for example, at ordinary temperature. The leached slurry is then filtered and washed at 16 and the washings and filtrate combined, the residue being cycled to the smelter for recovery of residuals.

The combined ammonia filtrate and washings from the ammonia leach are treated according to Step 4 in closed reactor 17 and heated while agitated to drive off the ammonia which is subsequently recovered. Silver chloride is produced as a suspension according to the following reaction:

$$Ag(NH_3)_2Cl \rightarrow AgCl + 2 NH_3\uparrow.$$

The distillation is terminated when the boiling point reaches 100° C, indicating removal of virtually all of the ammonia as a gas. The silver chloride is filtered at 18 and the filtrate 19 set aside, the silver chloride precipitate being then treated according to Step 5. An alternative to boiling off the ammonia is to neutralize the solution with sulfuric or nitric acid and precipitate the silver chloride.

In recovering silver under Step 5, the silver chloride, which is of very high purity, is slurried in reactor 20 in a hot vigorously agitated solution of sodium hydroxide. The sodium hydroxide requirements are based on at least the stoichiometric amount necessary to convert the silver chloride to silver hydroxide as follows: $AgCl + NaOH \rightarrow NaCl + AgOH$ plus an additional amount required to provide an alkaline solution of approximately 1 Normal after conversion of the silver chloride. After the silver chloride has been converted to silver hydroxide, a concentrated solution of dextrose or other reducing sugars is added to the reactor while the solution is continuously agitated. The reducing sugars convert the silver oxide to pure silver metal powder which is filtered off at 21 and washed, the dry silver particles being then melted in a crucible 22 (Step 6) e.g. a graphite crucible, and cast into silver ingots 23.

Care must be taken in reducing the silver oxide ($Ag_2O$) with dextrose as the reaction is highly exothermic according to the following reaction:

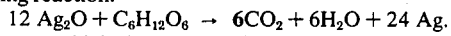

$$12\ Ag_2O + C_6H_{12}O_6 \rightarrow 6CO_2 + 6H_2O + 24\ Ag.$$

The rate at which the dextrose is added should therefore be controlled. Any number of other organic substances may be employed to reduce the silver oxide. For example, KARO syrup may be used. Examples of other organic reducing agents are recited hereinbefore by way of illustration and not by way of limitation.

The melting of silver in Step 6 is carried out under oxidizing conditions to insure burning off of any entrained organics, followed by reducing and cooling under reducing conditions.

An advantage of the foregoing process is that it enables a substantially quantitative recovery of silver from electrolytic copper refinery slimes using a relatively simple hydrometallurgical technique over a relatively low temperature range in the neighborhood of about 110° C. As illustrative of the quantitative yields possible in going from Step 1 to Step 6, the following specific example is given with reference to FIG. 2.

EXAMPLE

A total of 2 kilograms of electrolytic copper refinery slimes were slurried in 2 liters of 5$N$ HCl. Unless otherwise stated, all percentages are by weight. The slimes analyzed about 21.1% silver, showing a silver content in the slimes of about 422 grams (note box 25 of FIG. 2). The slurry was agitated while chlorine gas was sparged into it, the temperature rising about 100° C and the temperature maintained at substantially that level by the addition of heat whenever necessary. A chlorinated residue was obtained (box 26) amounting to about 1.412 kg and assaying 29.7% silver. The residue was filtered to provide a chlorination filtrate 27 which is combined with the water leach 28 and set aside for recovery of such solubilized elements as Se, Te, Pt, Pd, Cu, Ni, etc., originally present in the slimes, the filtrate also containing a very small amount of silver which is recoverable and, therefore, not lost. An amount of 50 grams was removed from the 1.412 kg of residue for analysis corresponding to 14.9 grams Ag. The silver, along with some lead, antimony, tin and silica, remained behind in the residue (26). The silver distribution as between the chlorination residue and the chlorination liquor (27) was as follows:

| Chlorination Residue | 99.7% |
|---|---|
| Chlorination Liquor | 0.3% |

The chlorination residue, after drying, was leached in boiling acidified water (28) in order to remove the lead chloride present. The acidified water contained one gram of HCl per liter of solution. The leaching is carried out at about 100° C for 1 hour at a ratio of solids to liquid of about 1:10 by weight. The suspended leached solids were settled with a flocculant and subsequently filtered off (29) to provide a residue (31), the filtrate (30) being removed and set aside.

The water leach residue (31) weighed 1.054 kg and contained 39.6% silver. The silver was analyzed by removing 33 grams (32), leaving a total of 1.021 kg for the ammonia leach (33). The silver distribution between the solids (31) and the filtrate (30) was as follows:

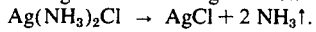

| % Ag in solids | 99.9% |
| --- | --- |
| % Ag in filtrate | 0.1% |

The hot water leach residue containing approximately 40% silver was then leached with ammonia under the following conditions:

| Grams NH$_3$/gram residue | 1.5 |
| --- | --- |
| Ammonia conc. | 15% |
| Time | 1 hour |

After completion of the leaching stp, the insoluble residue was filtered (34) and washed with a 5% ammonia solution, leaving a NH$_3$ leach residue of 456.5 grams (35). The 5% NH$_3$ wash solution is combined with the NH$_3$ leach filtrate, prior to distillation, which was distilled (36) to remove the ammonia and to precipitate silver chloride which was filtered at 37 and a highly pure silver chloride residue (38) obtained weighing 528.4 grams and containing about 74% silver.

The distribution of the silver between the ammonia leach liquor and leach residue demonstrates that substantially all of the silver originally in the slimes was chlorinated.

| Ammoniacal filtrate | 98.94% silver |
| --- | --- |
| Ammonia leach residue | 1.06% silver |

In actual practice, the ammonia leach residue (35) is returned to the smelter for recovery of residual silver and trace precious metals.

The silver chloride precipitate (38) obtained after the ammonia distillation was slurried in a hot aqueous solution (39) containing 114 grams per liter of sodium hydroxide (alkali metal hydroxide), the silver chloride concentration being about 265 grams per liter. The AgCl reacted with the sodium hydroxide as follows:

$AgCL + NaOH \rightarrow AgOH$ $2 AgOH \rightarrow Ag_2O + H_2O$

The silver oxide in the slurry was then reduced to silver by the addition of dextrose in which the end products are very high purity silver powder, CO$_2$ and H$_2$O. The endpoint of the reaction is determined when the color of the insoluble phase changes from a black amorphous solid to a silvery colored dense precipitate. The distribution of the silver after filtering (40) between the silver powder (42) and the spent reduction liquor (41) is given as follows:

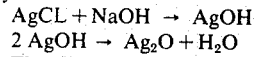

| % Ag reporting as Ag powder | 99.999% |
| --- | --- |
| % Ag loss in final solution | 0.00015% |

The silver recovered as silver powder 42 came to 388 grams, while the silver removed during the sampling for analysis amounted to 28 grams, thus resulting in a total of 416 grams. This accounts for 99% of the total silver (422 grams) in the slime, the 2.8% being recycled back into the process via filtrates and residues. As is apparent, the silver is substantially quantitatively recovered from the slimes.

The foregoing process is an improvement over the methods disclosed in U.S. Pat. No. 3,249,399 and No. 3,288,561. In the dry chlorination process of U.S. Pat. No. 3,249,399, the silver and precious metals plus Cu, Ni, Pb are left in the residue while Se, Te, Sb, As and Sn are volatilized, the chlorination temperature ranging from about 300°C to 500°C. The disadvantages of this process are that relatively high temperatures are employed which are difficult to control. In addition, the slimes must be specially treated by agglomerating the slimes in admixture with an inert binder, following which the agglomerated slimes are contacted by dry chlorine to convert at least a major portion of Se, Te, Sb, As, and Sn into volatile chlorides. Thus, silver, which is left in the residue, is recovered at the end of the process.

In U.S. Pat. No. 3,288,561, the slimes are mixed with alkali metal halides and the mixture formed into a fused salt bath, through which gaseous chlorine is bubbled at temperatures ranging from about 350° C to 900° C, whereby the Se, Te, Sb, As and Sn values are converted to volatile chlorides and collectively separated from the nonvolatiles, such as silver. The disadvantages inherent in this system are the problems related to the materials of construction arising from the corrosive effects of the molten salt bath, the difficulties encountered in mechanically agitating the fused mixture and the additional problem of maintaining a tight seal at elevated temperatures.

The advantages of the wet chlorination process are that silver is directly recovered without using pyrometallurgical techniques, the maximum temperature need not exceed 110° C; the rise in temperature is limited to the boiling points of the aqueous solutions used; silver and the bulk of the lead present are left in the residue in a one-step treatment operation, while the remaining elements, e.g. Se, Te, Sb, As, Sn, Cu, Ni, and the precious metals are simultaneously solubilized; no charge preparation is involved as in the two patents mentioned above, and the reaction rates are relatively fast. A particularly important advantage is that silver is separated from the remaining precious metals in the first step, thereby eliminating the need for a parting plant.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a method of separating silver value from electrolytic copper refinery slimes containing elements of the group consisting of Se, Te, Pb, Sb, Sn, As, Bi, Zn, Cu, Ni, Fe, Au, and the platinum group metals, the improvement which comprises, forming a slurry of said slimes in a hydrochloric acid solution, agitating said slurry while chlorinating said solution with gaseous chlorine whereby to solubilize substantially all of the elements in said slimes, while converting said silver to an insoluble silver chloride precipitate and form a silver-enriched residue, and then separating said silver-enriched residue from said solution containing said solubilized elements.

2. The method of claim 1, wherein the slurry is formed in a hydrochloric acid solution having a normality ranging up to about 12$N$.

3. The method of claim 1, wherein the silver-enriched residue is washed with acidified boiling water to remove the bulk of lead chloride present in the residue.

4. A method of separating silver value from electrolytic refinery slimes containing elements selected from the group consisting of Se, Te, Pb, Sb, Sn, As, Bi, Zn, Cu, Ni, Fe, Au, and the platinum group metals, which comprises, forming a slurry of said slimes in a hydrochloric acid solution, agitating said slurry while chlorinating said solution with gaseous chlorine, thereby solubilizing substantially all of the elements in said slimes, while converting said silver to insoluble silver chloride and forming a silver-enriched residue, separating the residue from said solution containing said solubilized elements, leaching said residue with acidified boiling water in order to remove the bulk of any lead chloride present in the residue, further leaching said leached residue with an ammoniacal solution to form soluble silver ammonium chloride, separating said solution as a filtrate from the residue, and quantitatively recovering said silver value from the filtrate.

5. The method of claim 4, wherein the slurry is formed in the hydrochloric acid solution having a normality ranging up to about 12$N$.

6. The method of claim 5, wherein the silver is quantitatively recovered as high purity silver chloride by neutralizing the ammonia with an acid.

7. The method of claim 5, wherein the silver is quantitatively recovered from the ammoniacal solution as high purity silver chloride by distilling the ammonia.

8. The method of claim 7, wherein the silver chloride is reduced to metallic silver.

9. The method of claim 8, wherein the silver chloride is reduced to metallic silver by adding the silver chloride to an alkaline solution formed of an alkali metal hydroxide containing a reducing agent therefor.

* * * * *